US006757973B2

(12) United States Patent
Park

(10) Patent No.: US 6,757,973 B2
(45) Date of Patent: Jul. 6, 2004

(54) METHOD FOR FORMING THROUGHHOLE IN INK-JET PRINT HEAD

(75) Inventor: Lae-soo Park, Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 76 days.

(21) Appl. No.: 09/833,552

(22) Filed: Apr. 13, 2001

(65) Prior Publication Data

US 2003/0164355 A1 Sep. 4, 2003

(30) Foreign Application Priority Data

Jul. 27, 2000 (KR) ........................................ 2000-43339

(51) Int. Cl.[7] ................................................ B23P 17/00

(52) U.S. Cl. ........................... 29/890.1; 451/29; 451/38

(58) Field of Search ................................ 29/890.1, 611; 451/29–31, 38

(56) References Cited

U.S. PATENT DOCUMENTS 5,387,314 A * 2/1995 Baughman et al.
5,833,516 A * 11/1998 De Haas et al. .............. 451/29

FOREIGN PATENT DOCUMENTS

| | | | |
|---|---|---|---|
| JP | 08-052882 | | 2/1996 |
| JP | 10-138497 | | 5/1998 |
| JP | 10-202889 | | 8/1998 |
| JP | 11-123824 | | 5/1999 |
| JP | 11-198387 | | 7/1999 |
| WO | WO 01/04982 | * | 1/2001 |

OTHER PUBLICATIONS

"Notice To Submit Response" issued by Korean Industrial Property Office dated on Mar. 30, 2003.

* cited by examiner

*Primary Examiner*—P. W. Echols
(74) *Attorney, Agent, or Firm*—Robert E. Bushnell, Esq.

(57) ABSTRACT

A method for forming a throughhole in an ink-jet print head of a bubble-jet system includes the steps of: forming a bubble-generator which is adjacent to a throughhole-forming region on one side of a substrate, and which includes a heater; forming a first mask layer for covering portions excluding the throughhole-forming region on a first side of the substrate; forming a second mask layer for covering portions excluding the throughhole-forming region on a second side of the substrate; forming a first well with a predetermined depth on the throughhole-forming region of the substrate not covered by the first mask layer by spraying sand under high pressure and at a high speed onto the first side of the substrate; forming a second well corresponding to the first well on the throughhole-forming region of the substrate not covered by the second mask layer by spraying sand under high pressure and at a high speed onto the second side of the substrate; forming a throughhole by overlap of the first well and the second well on the throughhole-forming region; and removing the first and second mask layers. Accordingly, a plurality of throughholes can be formed on a plurality of substrates at one time, and the time required for processing throughholes on one wafer can be reduced considerably compared to prior techniques, thereby promoting mass production. Furthermore, the size of the nozzle for spraying the sand, and consequently the size of the throughhole, is uniform and does not change. The size of the throughhole is determined by the mask layers, thereby forming a throughhole having a very uniform size with high precision.

34 Claims, 8 Drawing Sheets

METHOD FOR FORMING THROUGHHOLE IN INK-JET PRINT HEAD

CLAIM OF PRIORITY

This application makes reference to, incorporates the same herein, and claims all benefits accruing under 35 U.S.C. §119 from my application FORMING METHOD OF VIA-HOLE IN INK-JET PRINT HEAD filed with the Korean Industrial Property Office on Jul. 27, 2000 and there duly assigned Ser. No. 43339/2000.

BACKGROUND OF THE INVENTION

1. Technical Field

The present invention relates to a method for fabricating an ink-jet print head and, more particularly, to a method for forming a throughhole in an ink-jet print head.

2. Related Art

Methods for discharging ink in an ink-jet printer include use of an electro-thermal transducer (the so-called "bubble-jet method") for generating bubbles in ink and discharging the ink using a heat source. The electromechanical transducer discharges ink by varying the ink volume using piezoelectricity.

Such methods involve the use of an ink-jet print head having a throughhole formed in a substrate thereof for supplying ink through ink channels to ink chambers. Typically, such throughholes have been formed by spraying sand under high pressure and speed. However, such a technique has several significant disadvantages.

Specifically, such a technique is not suitable for mass production of the ink-jet heads. The sand spraying apparatus must be provided with a spray nozzle of highly-priced material and strong abrasion resistance. In addition, the throughhole openings formed by such a technique are often cracked or damaged in the fabrication or formation process. Finally, high-precision equipment is required in order to form a throughhole of precise size and positioning.

SUMMARY OF THE INVENTION

To solve the above problems, it is a first object of the present invention to provide a method for forming a throughhole in an ink-jet print head, wherein the time for forming the throughhole on an object to be processed is short, thus enabling mass production of the ink-jet print head.

It is a second object of the present invention to provide a method for forming a throughhole in an ink-jet print head, wherein the costs required for forming the throughhole are reduced and the unit price of the product is accordingly reduced.

It is a third object of the present invention to provide a method for forming a throughhole in an ink-jet print head, wherein damage to the edges of the throughhole on the opposite side of a processed surface due to shock imparted during formation of the throughhole and abnormal processing of the throughhole (that is, formation of curvature of the edges of the processed surface) can be efficiently suppressed.

It is a fourth object of the present invention to provide a method for forming a throughhole in an ink-jet print head, wherein the throughholes are formed with high precision and have a uniform size.

Accordingly, to achieve the above objects, there is provided a method for forming a throughhole in an ink-jet print head. The method includes the steps of forming a bubble-generator, including a heater, adjacent to a throughhole-forming region on one side of a substrate; forming a first mask layer for covering portions, excluding the throughhole-forming region on a first side of the substrate; forming a second mask layer for covering portions, excluding the throughhole-forming region, on a second side of the substrate; forming a first well having a predetermined depth on the throughhole-forming region of the substrate, and which is not covered by the first mask layer, by spraying sand under high pressure at a high speed onto the first side of the substrate; forming a second well corresponding to the first well on the throughhole-forming region of the substrate by spraying sand under high pressure at high speed onto the second side of the substrate with the second well not covered by the second mask; forming a throughhole by overlapping the first well and the second well on the throughhole-forming region; and removing the first and second mask layers.

The processes on the substrate are performed on one entire wafer at a time, the wafer having a plurality of substrates thereon. Also, the sand is sprayed under high pressure and at high speed onto each side of the wafer. Preferably, a region of the wafer at which the sand is sprayed, and on which the plurality of substrates is provided, is large enough to include a plurality of substrates. Since the region on which the sand is sprayed moves to each side of the wafer, it is possible for the sand spraying apparatus and the wafer to move relative to one another so that the sprayed region on the wafer may be moved as required.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, and wherein.

DETAILED DESCRIPTION OF THE INVENTION

A process for forming a bubble-generator before forming a throughhole will be excluded in the following description.

The process for forming a bubble-generator is performed by well-known processes. The bubble-generator includes a heater, a signal line connected to the heater, an electrode pad provided on an end portion of the signal line, and an insulating layer for protecting the elements and preventing contact with ink. That is, the ink-jet print head according to the present invention has the structure shown in FIG. 1, but the form of the throughhole formed by the present invention is slightly different from that of the print head shown in FIG. 1.

Figure 1:
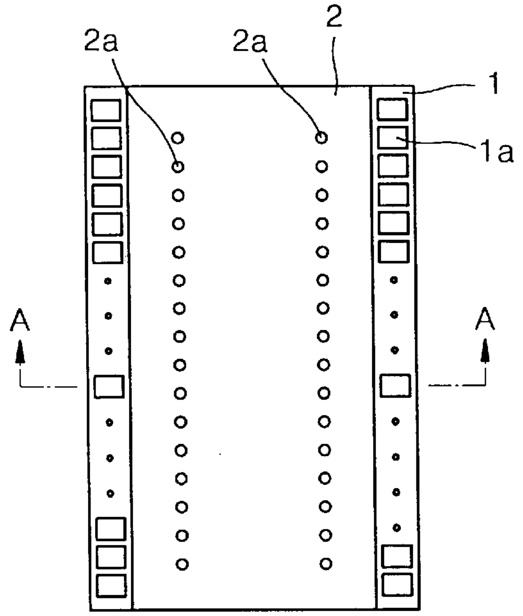
FIG. 1 is a plan view of an ink-jet print head.
Figure 2:
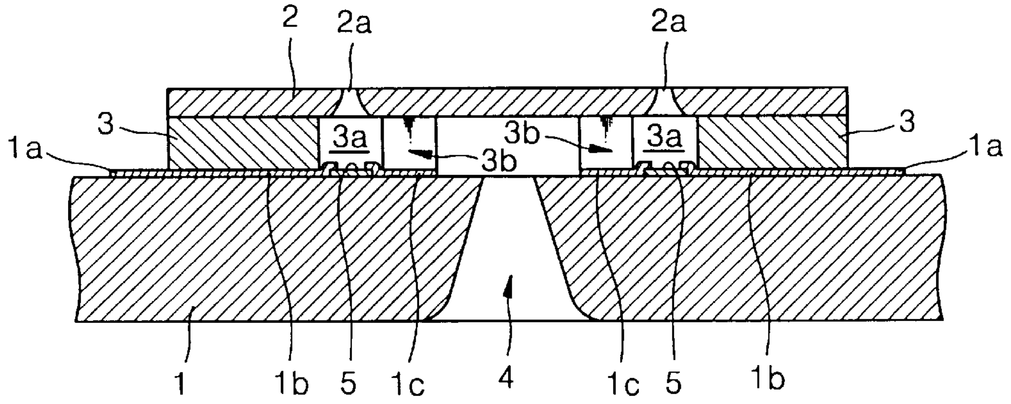
FIG. 2 is a sectional view taken along line A—A of FIG. 1.
Figure 3:
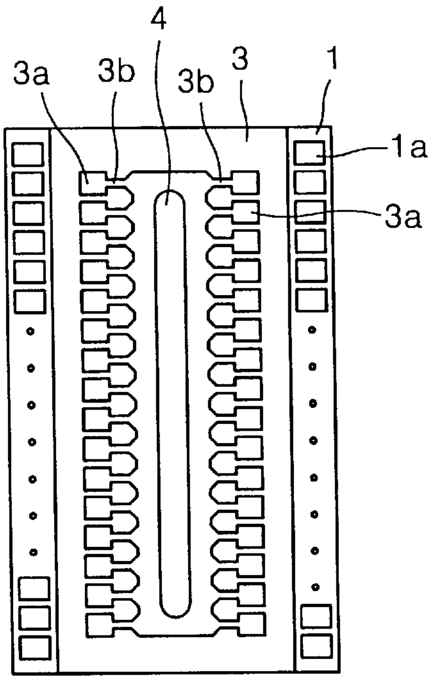
FIG. 3 is a plan view of the structure of an ink chamber in a state where a nozzle plate is removed from the ink-jet print head shown in FIG. 1.

FIG. 1 is a plan view of an ink-jet print head, FIG. 2 is a sectional view taken along line A—A of FIG. 1, and FIG. 3 is a plan view of the structure of an ink chamber in a state where a nozzle plate is removed from the ink-jet print head shown in FIG. 1.

Referring to FIGS. 1 thru 3, electrode pads 1*a* are arranged at a predetermined interval along both edges in longitudinal directions of a substrate 1, and intermediate layers 3 providing ink chambers 3*a* and ink channels 3*b* are formed in two lines on an upper side of the substrate 1, while a nozzle plate 2 having nozzles 2*a* corresponding to each ink chamber 3*a* is fixed on the intermediate layers 3.

A heater 5 is provided at the bottom of each ink chambers 3*a*, and the heaters 5 are connected to the electrode pads 1*a* by signal lines 1*b* and 1*c*. In general, the signal lines 1*b* and 1*c* are integrated into the electrode pads 1*a*, and an insulating layer (not shown) is formed on the heaters 5 and the signal lines 1*b* and 1*c* such that the heaters 5 do not contact the ink inside the ink chambers 3*a*. The heaters 5 provided on the bottoms of the ink chambers 3*a* as shown in FIG. 2 but not in FIGS. 1 and 3.

Meanwhile, a throughhole 4 for supplying ink through each of the ink channels 3*b* to the ink chambers 3*a* in each line is formed in the middle of the substrate 1. The throughhole 4 is connected to an ink tube (not shown) in which ink is stored, and supplies ink from the ink tube to the ink chambers 3*a*.

The throughhole 4 in an ink-jet print head having the above structure is formed by sandblasting after the heaters 5, the signal lines 1*b* and 1*c*, and the electrode pads 1*a* are formed is on the substrate 1.

Figure 4:
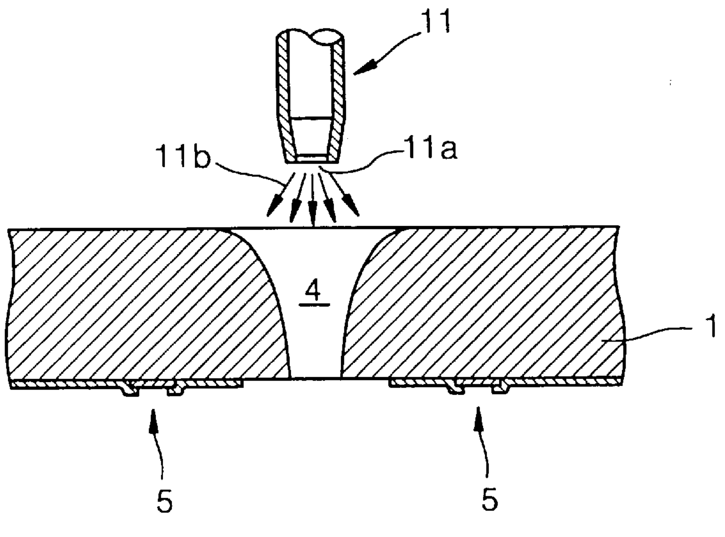
FIG. 4 is a diagram illustrating a method for forming a throughhole in an ink-jet print head.

FIG. 4 is a diagram illustrating a method for forming a throughhole in an ink-jet print head. As shown in FIG. 4, the throughhole 4 is formed on the substrate 1 by spraying sand 11*b* at high speed and pressure using a sand blasting machine 11 having a nozzle pipe 11*a* of size corresponding to the width of one end of the throughhole 4. In this manner, the throughhole 4 is extended in a longitudinal direction of the substrate 1, and then the substrate 1, which is the workpiece to be processed, moves in one direction and a predetermined length of the throughhole 4 is formed, as described in FIG. 5. The sand blasting machine 11 sprays the sand 11*b* through the rear side of the substrate 1 on which the heaters 5 are not formed so as to form the 7 throughhole 4 by penetrating the substrate 1.

The substrate 1 and the sand blasting machine 11 must move relative to one another in order to form one throughhole 4 by the above method. In particular, the sand blasting machine 11 must be aligned at a designated process position of the substrate 1, and one throughhole 4 at a time is formed. The position of the sand blasting machine 11 must be fixed, and the object to be processed is a wafer on which a plurality of substrates 1 is arranged. The wafer must be installed on a stage capable of moving in the X-Y-Z directions, and the stage must be precisely operated by an automatic control device.

Figure 5:
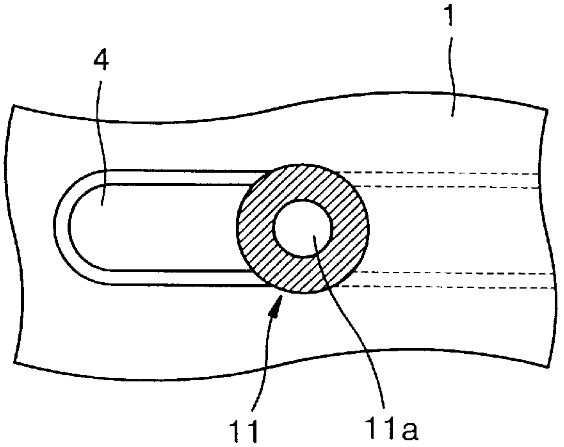
FIG. 5 is a diagram illustrating a method for forming a throughhole in an ink-jet print head, and shows the state where a substrate moves relative to a nozzle for spraying sand to form one throughhole.

According to the above method, as described in FIG. 5, since a 0.2 thru 0.3 mm slit-type throughhole must be formed with high precision, the hole size of a spray nozzle 11 must be smaller than the horizontal width of the throughhole 4. As processing time passes, the spray nozzle 11*a* becomes worn. As a result, the distance between the spray nozzle 11*a* and the object to be processed must be properly adjusted.

Disadvantages of the above method for forming a throughhole are as follows:

First, a circular spray nozzle 11*a* must sequentially process one throughhole at a time, so that the method is not suitable for a mass production system.

Second, the spray nozzle 11*a* for spraying the sand must be a subminiature size, and must be fabricated with a high-price material having strong abrasion resistance. Otherwise, the spray nozzle 11*a* will be rapidly worn out, and will need to be replaced frequently. Therefore, the price of the product is increased.

Third, during processing, edges of the openings of the throughhole formed by shock of the sand are sometimes damaged, or they sometimes crack, so that the yield of the product is low.

Fourth, a high-precision X-Y-Z stage and a device for controlling the high-precision X-Y-Z stage are required to exactly control the size of the throughhole and its position in the ink-jet head.

Figure 6A:
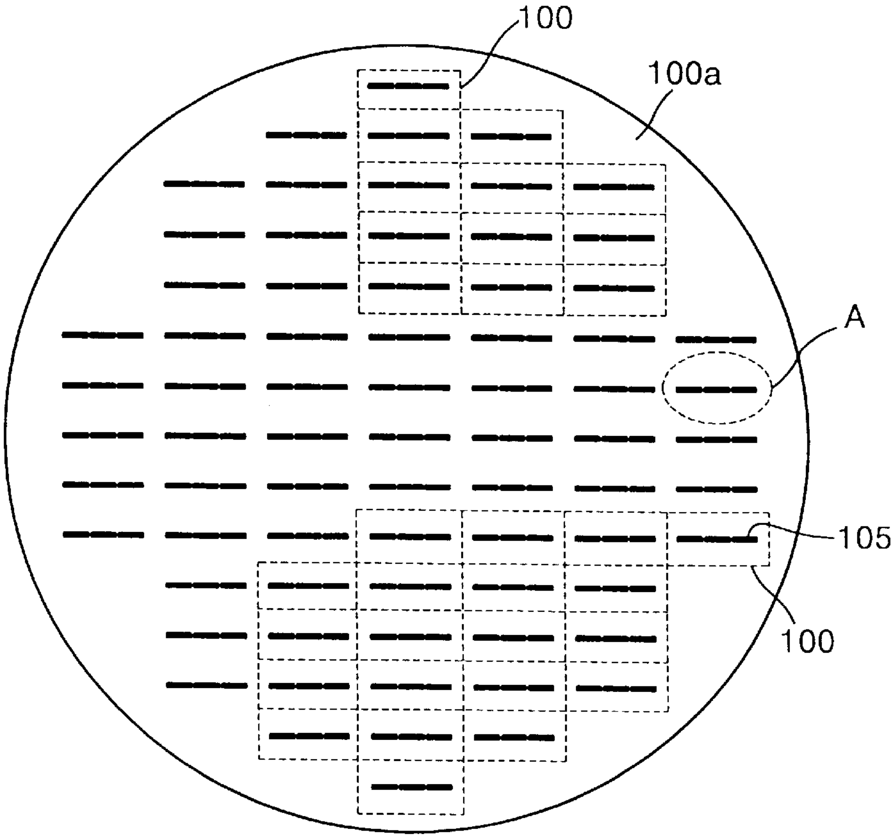
FIG. 6A is a plan view of a wafer on which a plurality of substrates to be made into ink-jet print heads are arranged.

FIG. 6A is a plan view of a wafer on which a plurality of substrates to be made into ink-jet print heads are arranged.

In FIG. 6A, a plurality of substrates 100 for an inkjet print head are closely arranged on a wafer 100*a*, and three throughholes 105 are already formed on each of the substrates 100.

Figure 6B:
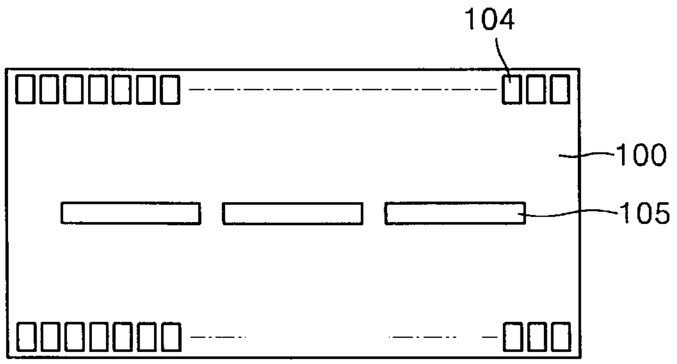
FIG. 6B is a magnified diagram of part A of FIG. 6A.

FIG. 6B is a magnified diagram of part A of FIG. 6A. The number of the throughholes 105 formed on each of the substrates 100 may be one or more than one, depending on the design.

Hereinafter, a method comprising a sequence of steps for forming a throughhole in an ink-jet print head of the present invention will be described. For simplicity, although the steps are performed on an entire wafer at a time, steps performed on only one substrate will be described.

FIGS. 7 thru 13 are process diagrams illustrating a method for forming a throughhole in an ink-jet print head according to the present invention.

Figure 7:
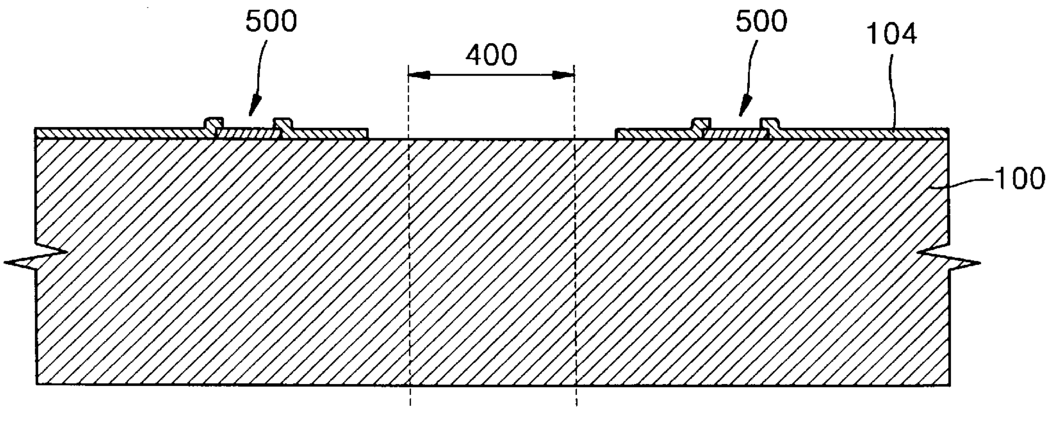
FIGS. 7 thru 13 are process diagrams illustrating a method for forming a throughhole in an ink-jet print head according to the present invention.

Specifically, FIG. 7 shows the state where bubble-generator 500 is formed on the substrate 100. The bubble-generator 500 is formed on both sides of a throughhole-forming region 400 of the substrate 100. The bubble-generator 500 on each substrate 100 is processed in units of wafers.

Figure 8:
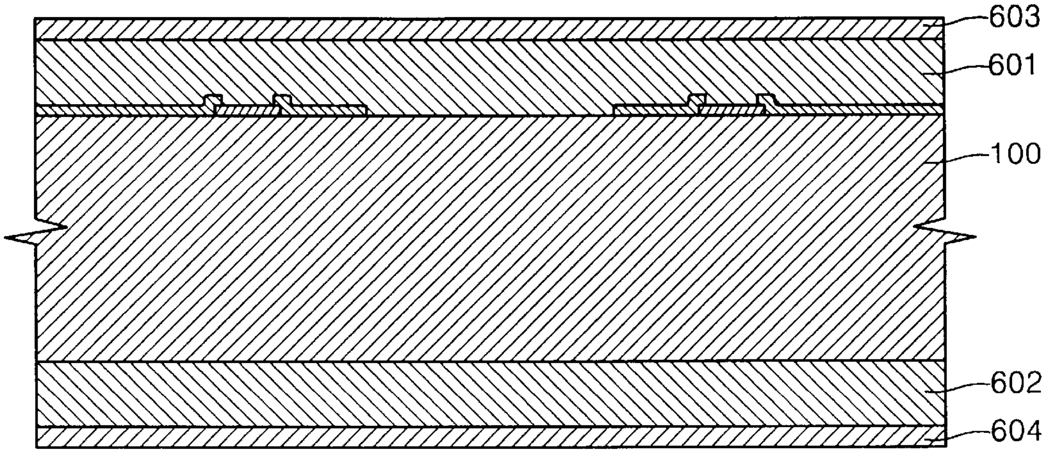

As shown in FIG. 8, a first mask layer 601 and a second mask layer 602, each having strong abrasion resistance, are formed on both sides of the substrate 100. Third and fourth mask layers 603 and 604, respectively, for patterning the first and second mask layers 601 and 602, respectively, are formed on the first and second mask layers 601 and 602, respectively.

The first and second mask layers 601 and 602, respectively, have strong abrasion resistance with respect to sand sprayed at high speed and under high pressure during the sand-processing, and are dry films attached by a laminating process for a thermal press. The third and fourth mask layers 603 and 604, respectively, are photoresist layers formed by lamination or a spinning process.

Figure 9:
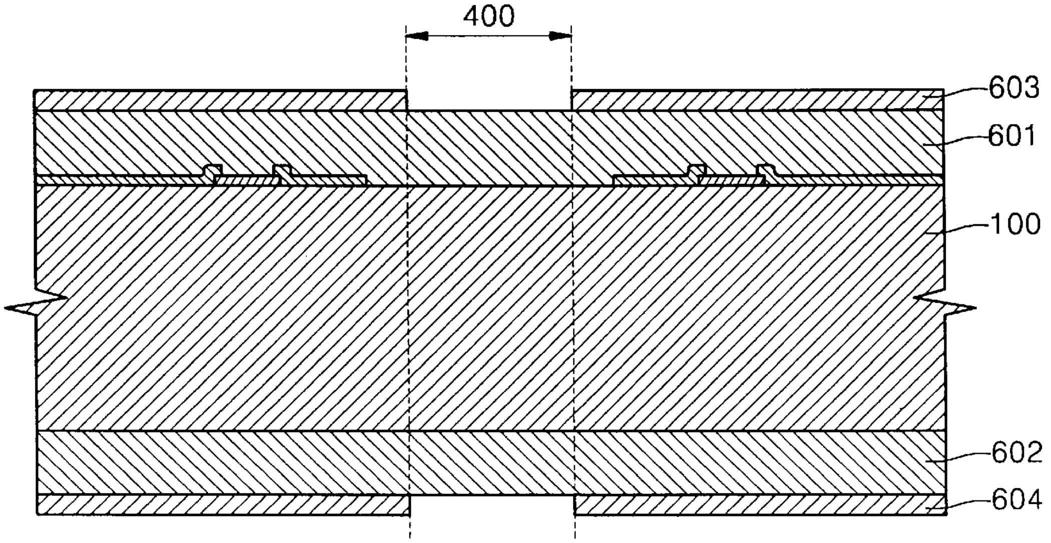

As shown in FIG. 9, portions corresponding to the throughhole-forming region 400 are etched in the third and fourth mask layers 603 and 604, respectively, and then surfaces of the first and second mask layers 601 and 602, respectively, are exposed at the throughhole-forming region 400.

Figure 10:
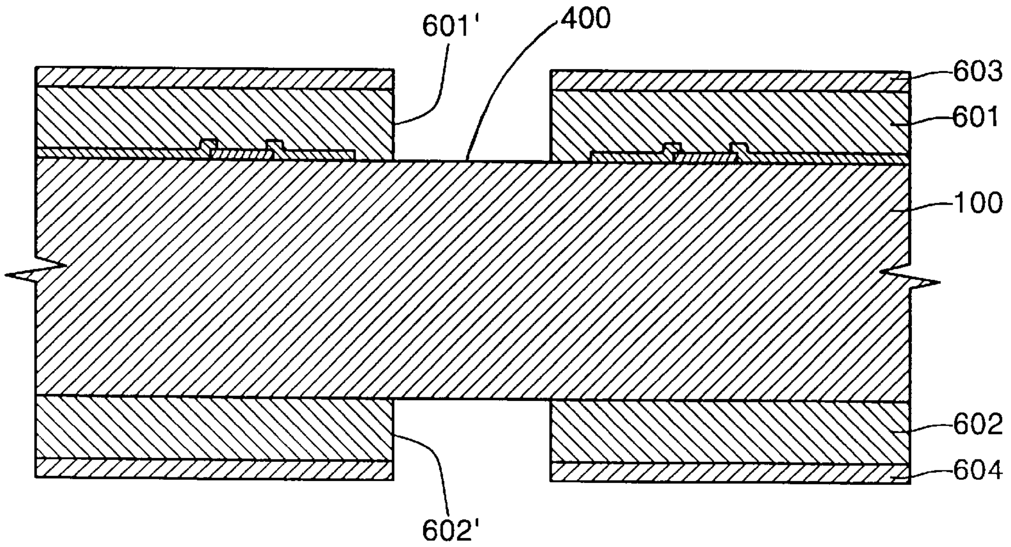

As shown in FIG. 10, the exposed portions of the first and second mask layers 601 and 602, respectively, are etched in the throughhole-forming region 400 using the third and fourth mask layers 603 and 604, respectively, as an etching mask, and then, openings 601' and 602' exposing the surface of the substrate 100 are formed.

Figure 11:
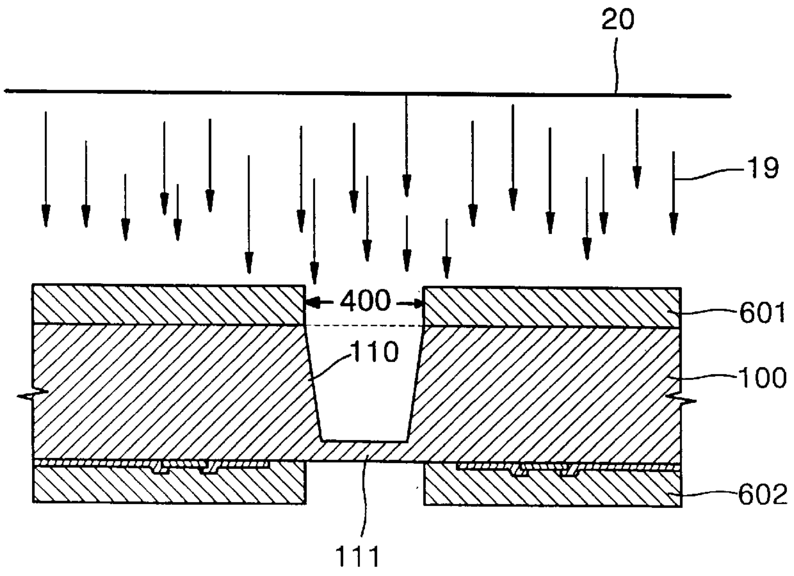

As shown in FIG. 11, sand 19 is sprayed at high speed and under high pressure from a sand blasting machine 20 in one direction at the substrate 100 after the third and fourth mask layers 603 and 604, respectively, are removed, and a first well 110 having a bottom 111, with a predetermined depth, is formed on the throughhole-forming region 400 of the substrate 100 exposed by the opening 601' of the first mask layer 601.

Figure 12:
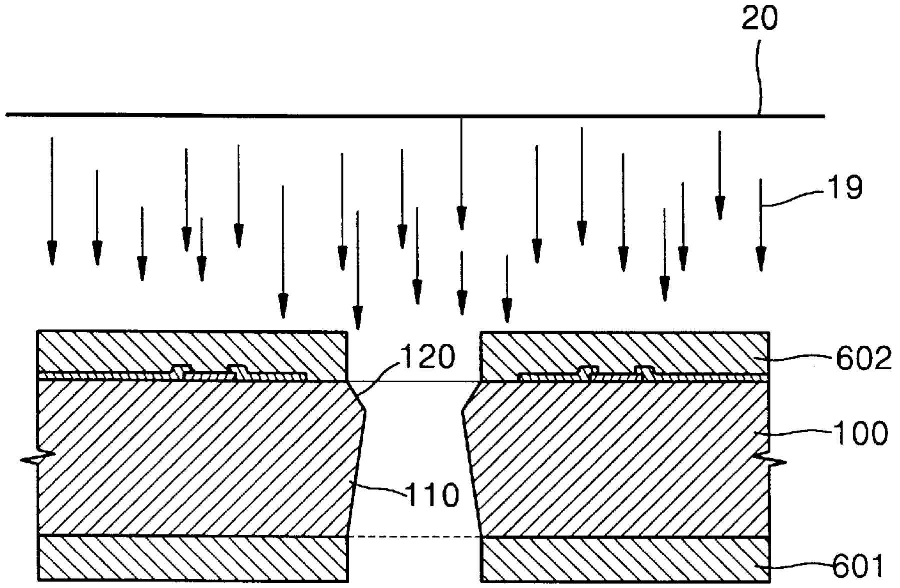

As shown in FIG. 12, the high pressure sand 19 is sprayed at high speed from the sand blasting machine 20 in another direction at the substrate 100, and a second well 120 is formed on the throughhole-forming region 400 of the substrate 100 exposed by the opening 602' of the second mask layer 602, and the bottom 111 of the first well 110 is removed.

Figure 13:
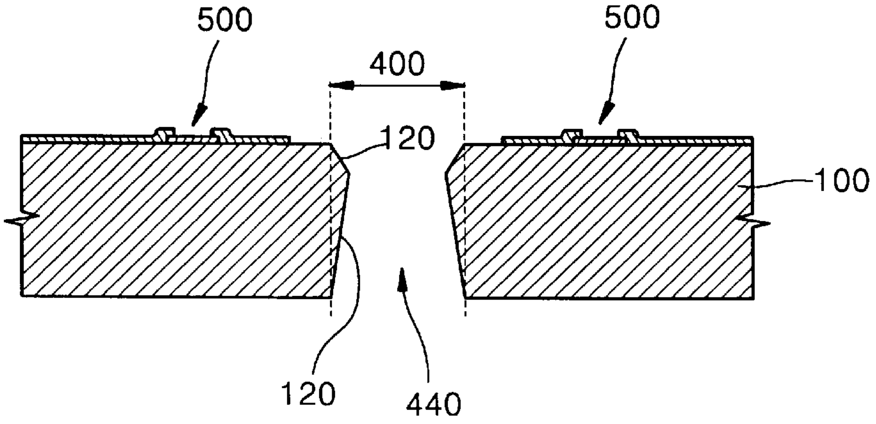

As shown in FIG. 13, the first and second mask layers 601 and 602, respectively, are removed. Also, a throughhole according to the present invention is formed by overlap of the first well 110 and the second well 120.

Figure 14:
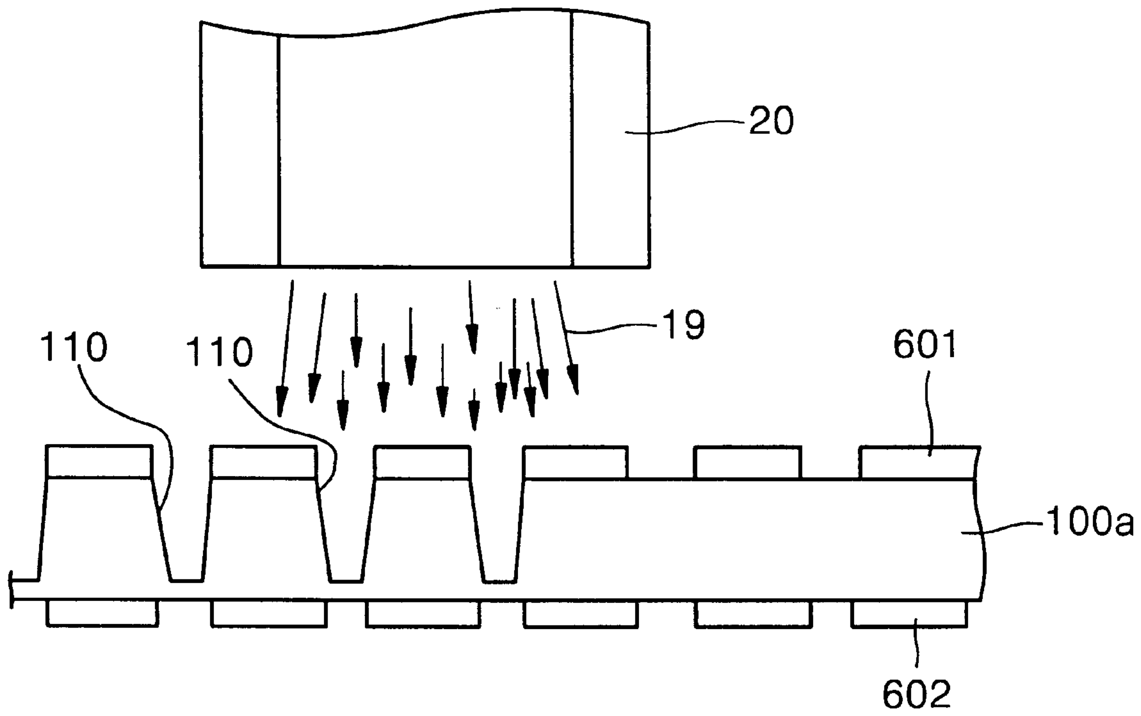
FIG. 14 shows the state where throughholes are formed, one wafer at a time, in accordance with the method for forming a throughhole in an ink-jet print head according to the present invention.

FIG. 14 shows the state of processing of the throughholes by the sand blasting machine 20 when the processes are performed in units of wafers.

Referring to FIG. 14, the position of a sand blasting machine 20 is fixed, and a wafer 100*a*, on which a plurality of substrates is arranged, is positioned below the sand blasting machine 20, and is slowly moved in one direction. Then, wells for throughholes are formed. The sand blasting machine 20 does not spray sand 19 onto a single specific substrate, but sequentially sprays the sand 19 onto a region having a predetermined area, or the area of a nozzle region, until the entire surface of the wafer 100*a* has been sprayed. A first well 110 is sequentially formed by the sand 19 sprayed onto portions not covered by the first mask layer 601. In order to form the first wells 110 at all of the throughhole-forming regions 400, the sand 19 must be sprayed onto the entire surface of the wafer 100*a*, and then, the wafer 100*a* must be moved. A process for forming a second well on portions not covered by the second mask layer 602 is performed in accordance with the above method.

As described above, in the present invention, the spray nozzle of the sand blasting machine is not inserted into one throughhole. Rather, sand is sprayed on a partial region of the wafer, thereby forming wells in the portions not covered by the mask layers directly opposite each other on both sides of the substrates, and forming throughholes due to overlap of the wells.

As described above, a throughhole is formed by the process of spraying sand onto a wafer, that is, a predetermined distance past the surface of the wafer. According to the present invention, a plurality of throughholes can be formed at one time, and in particular, their number is controlled by the size of the region on which the sand is sprayed onto the wafer. According to the features of the invention, the time required for processing throughholes on one wafer can be reduced considerably compared to prior techniques, thereby promoting mass production. Furthermore, the size of the nozzle for spraying the sand, and consequently the size of the throughhole, does not change. The size of the throughhole is determined by the mask layers, thereby forming a throughhole having a very uniform size with high precision.

Furthermore, since portions excluding the throughhole-forming region during sand-spraying are protected by the mask layers, abnormal abrasion or shock to the wafer or the substrate is prevented. In particular, the mask layers absorb shock caused by the sand, and therefore physical shock to the substrate is reduced.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method for forming a throughhole in an ink-jet print head, comprising the steps of:

(a) forming a bubble-generator, including a heater, adjacent to a throughhole-forming region on one side of a substrate;

(b) forming a first mask layer for covering portions, excluding the throughhole-forming region, on a first side of the substrate;

(c) forming a second mask layer for covering portions, excluding the throughhole-forming region, on a second side of the substrate;

(d) forming a third mask layer on the first mask layer and forming a fourth mask layer on the second mask layer;

(e) forming a first well having a predetermined depth on the throughhole-forming region of the substrate not covered by the first mask layer by spraying sand under high pressure and at high speed onto the first side of the substrate;

(f) forming a second well corresponding to the first well on the throughhole-forming region of the substrate not covered by the second mask layer by spraying sand under high pressure and at high speed onto the second side of the substrate; and (g) forming a throughhole by overlap of the first well and the second well on the throughhole-forming region.

2. The method for forming a throughhole in an ink-jet print head according to claim 1, wherein the steps performed on the substrate are performed at a given time on one entire wafer, on which a plurality of substrates is arranged.

3. The method for forming a throughhole in an ink-jet print head according to claim 2, wherein wells are formed on all throughhole-forming regions, within a region onto which the sand under high pressure is sprayed at high speed, onto the plurality of substrates on the wafer.

4. The method for forming a throughhole in an ink-jet print head according to claim 3, wherein the sand under high pressure is sprayed at high speed in a fixed position, and the wafer moves relative to the first position where the sand is sprayed.

5. The method for forming a throughhole in an ink-jet print head according to claim 4, wherein a plurality of throughhole-forming regions is formed on one substrate.

6. The method for forming a throughhole in an ink-jet print head according to claim 3, wherein a plurality of throughhole-forming regions is formed on one substrate.

7. The method for forming a throughhole in an inkjet print head according to claim 2, wherein a plurality of throughhole-forming regions is formed on one substrate.

8. The method for forming a throughhole in an ink-jet print head according to claim 2, wherein the sand under high pressure is sprayed at high speed in a fixed position, and the wafer moves relative to the first position where the sand is sprayed.

9. The method for forming a throughhole in an ink-jet print head according to claim 1, wherein a plurality of throughhole-forming regions is formed on one substrate.

10. The method for forming a throughhole in an ink-jet print head according to claim 1, wherein the sand under high pressure is sprayed at high speed in a fixed position, and the wafer moves relative to the first position where the sand is sprayed.

11. The method for forming a throughhole in an ink-jet print head according to claim 1, wherein wells are formed on all throughhole-forming regions, within a region onto which the sand under high pressure is sprayed at high speed, onto a plurality of substrates on the wafer.

12. The method for forming a throughhole in an ink-jet print head according to claim 1, further comprising the step, after forming the third and fourth mask layers but before step (e), of etching the third and fourth mask layers so as to expose portions of the first and second mask layers.

13. The method for forming a throughhole in an ink-jet print head according to claim 12, further comprising the step, after etching the third and fourth mask layers but before step (e), of etching the exposed portions of the first and second mask layers using the third and fourth mask layers as etching masks so as to expose surfaces of the substrate, and then removing the third and fourth mask layers.

14. The method for forming a throughhole in an ink-jet print head according to claim 13, wherein the steps performed on the substrate are performed at a given time on one entire wafer, on which a plurality of substrates is arranged.

15. The method for forming a throughhole in an ink-jet print head according to claim 13, wherein a plurality of throughhole-forming regions is formed on one substrate.

16. The method for forming a throughhole in an ink-jet print head according to claim 13, wherein the sand under high pressure is sprayed at high speed in a fixed position, and the wafer moves relative to the first position where the sand is sprayed.

17. The method for forming a throughhole in an ink-jet print head according to claim 13, wherein wells are formed on all throughhole-forming regions, within a region onto which the sand under high pressure is sprayed at high speed, onto a plurality of substrates on the wafer.

18. A method for forming a throughhole in an ink-jet print head, comprising the steps of:

(a) establishing a throughhole-forming region on one side of a substrate;

(b) forming a first mask layer for covering portions, excluding the throughhole-forming region, on a first side of the substrate;

(c) forming a second mask layer for covering portions, excluding the throughhole-forming region, on a second side of the substrate;

(d) forming a third mask layer on the first mask layer and forming a fourth mask layer on the second mask layer;

(e) forming a first well on the throughhole-forming region of the substrate not covered by the first mask layer by spraying sand onto the first side of the substrate;

(f) forming a second well corresponding to the first well on the throughhole-forming region of the substrate not covered by the second mask layer by spraying sand onto the second side of the substrate; and (g) forming a throughhole by overlap of the first well and the second well on the throughhole-forming region.

19. The method for forming a throughhole in an ink-jet print head according to claim 18, wherein the steps performed on the substrate are performed at a given time on one entire wafer, on which a plurality of substrates is arranged.

20. The method for forming a throughhole in an ink-jet print head according to claim 19, wherein wells are formed on all throughhole-forming regions, within a region onto which the sand is sprayed, onto the plurality of substrates on the wafer.

21. The method for forming a throughhole in an ink-jet print head according to claim 20, wherein the sand is sprayed in a fixed position, and the wafer moves relative to the first position where the sand is sprayed.

22. The method for forming a throughhole in an ink-jet print head according to claim 21, wherein a plurality of throughhole-forming regions is formed on one substrate.

23. The method for forming a throughhole in an ink-jet print head according to claim 20, wherein a plurality of throughhole-forming regions is formed on one substrate.

24. The method for forming a throughhole in an ink-jet print head according to claim 19, wherein a plurality of throughhole-forming regions is formed on one substrate.

25. The method for forming a throughhole in an ink-jet print head according to claim 19, wherein the sand is sprayed in a fixed position, and the wafer moves relative to the first position where the sand is sprayed.

26. The method for forming a throughhole in an ink-jet print head according to claim 18, wherein a plurality of throughhole-forming regions is formed on one substrate.

27. The method for forming a throughhole in an ink-jet print head according to claim 18, wherein the sand is sprayed in a fixed position, and the wafer moves relative to the first position where the sand is sprayed.

28. The method for forming a throughhole in an ink-jet print head according to claim 18, wherein wells are formed on all throughhole-forming regions, within a region onto which the sand is sprayed, onto a plurality of substrates on the wafer.

29. The method for forming a throughhole in an ink-jet print head according to claim 18, further comprising the step, after forming the third and fourth mask layers but before step (e), of etching the third and fourth mask layers so as to expose portions of the first and second mask layers.

30. The method for forming a throughhole in an ink-jet print head according to claim 29, further comprising the step, after etching the third and fourth mask layers but before step (e), of etching the exposed portions of the first and second mask layers using the third and fourth mask layers as etching masks so as to expose surfaces of the substrate, and then removing the third and fourth mask layers.

31. The method for forming a throughhole in an ink-jet print head according to claim 30, wherein the steps performed on the substrate are performed at a given time on one entire wafer, on which a plurality of substrates is arranged.

32. The method for forming a throughhole in an ink-jet print head according to claim 30, wherein a plurality of throughhole-forming regions is formed on one substrate.

33. The method for forming a throughhole in an ink-jet print head according to claim 30, wherein the sand under high pressure is sprayed at high speed in a fixed position, and the wafer moves relative to the first position where the sand is sprayed.

34. The method for forming a throughhole in an ink-jet print head according to claim 30, wherein wells are formed on all throughhole-forming regions, within a region onto which the sand under high pressure is sprayed at high speed, onto a plurality of substrates on the wafer.

* * * * *